United States Patent [19]

Maruyama et al.

[11] 4,368,171
[45] Jan. 11, 1983

[54] METHOD OF CONTROLLING OPERATION OF NUCLEAR REACTOR

[75] Inventors: Hiromi Maruyama; Masayuki Izumi; Sadao Uchikawa; Renzo Takeda, all of Hitachi, Japan

[73] Assignee: Hitachi, Ltd., Tokyo, Japan

[21] Appl. No.: 210,168

[22] Filed: Nov. 25, 1980

Related U.S. Application Data

[63] Continuation of Ser. No. 936,921, Aug. 25, 1978.

[30] Foreign Application Priority Data

Aug. 26, 1977 [JP] Japan ................. 52-101557

[51] Int. Cl.³ .............................. G21C 7/08
[52] U.S. Cl. ..................... 376/217; 376/218; 376/236
[58] Field of Search ............. 376/217, 236, 218, 419

[56] References Cited

U.S. PATENT DOCUMENTS

| | | | |
|---|---|---|---|
| 3,020,888 | 2/1962 | Braun | 376/236 |
| 3,565,760 | 2/1971 | Parkos et al. | 376/217 |
| 3,799,839 | 2/1979 | Fischer et al. | 376/419 |
| 4,057,463 | 1/1977 | Morita et al. | 376/218 |

OTHER PUBLICATIONS

Nuc. Tech., vol. 28, (1/76), pp. 108–118 Kawai et al.
Control of Nuclear Reactors and Power Plants, Schultz, McGraw Hill Book Co. (1955), N.Y., pp. 20, 21, 61, 98–100, 113, 126, 127, 252–255, 260–261, 272–275.

*Primary Examiner*—Sal Cangialosi
*Attorney, Agent, or Firm*—Antonelli, Terry & Wands

[57] ABSTRACT

A method of operating a nuclear reactor adapted to use cross-shaped control rods. The control rods are grouped into a plurality of groups having a first group consisting of a control rod located at the center of the core, a second group consisting of 8 control rods surrounding the control rod of the first group, a third group consisting of control rods located adjacent to and outside of the control rods of the second group, and other groups determined successively in the same manner as in the third group. During the operation period other than the period in which the number of the control rods to be inserted for realizing the critical condition of said nuclear reactor is less than 6, the nuclear reactor is operated with control rod patterns in which the inserted control rods are selected from control rods of alternate or every other groups of said groups so as to include at least a pair of control rods which are located in a similar manner to that of the KNIGHT's movement on a chess board.

8 Claims, 14 Drawing Figures

METHOD OF CONTROLLING OPERATION OF NUCLEAR REACTOR

This is a continuation of application Ser. No. 936,921, filed Aug. 25, 1978.

BACKGROUND OF THE INVENTION

The present invention relates to a method of operating nuclear reactors, in particular, to a method of operating a boiling water reactors adapted to use cross-shaped control rod.

In the boiling water reactors, the power distribution is skewed to the lower portion of the core of reactor due to the axial void distribution. It has therefore been attempted to dispose a burnable poison, typically gadolinea, at the lower portion of the core where the peaking of the power exists, or to insert control rods from the bottom of the core to a small depth (referred to as shallow control rods), thereby to flatten the axial power distribution. At the same time, in order to obtain a uniform radial distribution of the power, control rods of large insertion depth (referred to as deep control rods) are dispersed over the cross-section of the core.

Since the control rods are used for a multiplicity of purposes including the flattening of axial and radial power distributions, as well as the control of reactivity, the arrangement of the control rods is rendered highly complicated as shown in FIG. 1 showing a cross-section of the entire reactor core.

In FIG. 1, each square or box represents a unit consisting of a control rod and four fuel assemblies disposed around the control rod. The numeral appearing in each box represents the number of section as counted from the bottom to which the associated control rod is inserted from the bottom of the core, on an assumption that the whole core height is divided into 24 (twenty four) sections. The control rods in the blank boxes are fully withdrawn. The planning of such a complicated control rod pattern as that shown in FIG. 1 requires a number of steps of calculations. In addition, this operating method involves various problems, such as a steep change of power level observed in the areas around the ends of the shallow control rods for controlling the axial power distribution.

In order to overcome these problems, Japanese Patent Application Nos. 115268/76 and 115269/76 propose methods of operation in which the core is divided at its mid portion into two regions in the axial direction, and the upper region is operated at a larger infinite multiplication factor than the lower region, so as to reduce the skewing of the power distribution attributable to the presence of the void distribution, thereby to flatten the power distribution. In the reactors operated in accordance with these proposed methods, the shallow control rods are not required since it is not necessary to flatten the axial power distribution by the control rods. This affords a larger degree of freedom for the selection of positions of the deep control rods, which has been restricted due to the presence of the shallow control rods, so that the flattening of the radial power distribution pattern has become easier to attain.

Incidentally, in the operating method using deep and shallow control rods in combination, the control rods are divided into two groups A and B, as shown in FIGS. 2a and 2b. Further, the group A can assume two patterns: an $A_1$ pattern in which deep and shallow control rods are disposed at boxes $A_1$ and $A_2$, respectively, and an $A_2$ pattern in which deep and shallow control rods are disposed at boxes $A_2$ and $A_1$, respectively. Similarly, the group B can assume two patterns: pattern $B_1$ and pattern $B_2$.

In practical operation, the four patterns are cyclically changed from one to another in the order of, for example, $A_1$ to $B_1$, to $A_2$, to $B_2$ and then again to $A_1$, to each burn-up of 1000Wd/t. At the same time, the operation of control rods of B group has to be checked by a locking mechanism, which is referred to as a control rod value minimizer, when $A_1$ or $A_2$ pattern is selected.

FIG. 3 shows an example of control rod pattern planned in accordance with the above-explained operating method for the aforementioned reactor which can be managed only by the deep control rods. The core of this example is identical to that of a 800 MWe class boiling water reactor which will be mentioned later in the description of the preferred embodiments of the present invention. That is, this core is designed in accordance with the teachings of the aforementioned Japanese Patent Application Nos. 115268/76 and 115269/76. In this core, as explained before, the axial power distribution is conveniently flattened, so that the required operation standard can be fulfilled even by the conventional operating method. The maximum linear heat generating rate and minimum critical power ratio MCPR of this core are 10.42 KW/ft and 1.40, respectively. The grouping of the control rods, however, restricts degree of freedom of selection of inserting positions of the control rods, because it relies upon the simultaneous use of the deep and shallow control rods. Thus, this operating method exhibits a power peaking which is larger by 4% than that realized in the operating method of the invention in which, as will be detailed later, the control rod pattern in the form of concentric circles is adopted.

SUMMARY OF THE INVENTION

It is therefore a major object of the invention to provide a method of operating nuclear reactors adapted to use cross-shaped control rods, as in the aforementioned reactor, in which the radial power destribution and reactivity are controlled mainly by the control rods.

The control rods used for flattening the radial power distribution are inserted to a large depth, i.e. up to a large height, so as not to incur distortion of the axial power distribution, and the flatness of the radial power distribution is determined mainly by the locations or positions of these deeply inserted control rods.

Generally speaking, the optimum density of number of the control rods for flattening the radial power distribution is changed continuously in the radial direction. On the other hand, the number of control rods which are allowed to be inserted is determined by the excess reactivity of the core. According to the invention, in order to realize in the actual reactor the control rod pattern which approximates to the above-mentioned ideal density distribution, the control rods are divided into a plurality of groups in the forms of concentric circles, depending on the radial distances from the center of the core. The desired control rod patterns are formed with suitable combinations of these groups.

In detail, during the operation period other than the period in which the number of control rods to be inserted for realizing the critical condition of said nuclear reactor is less than 6, the nuclear reactor is operated with control rod patterns in which the inserted control rods are selected from control rods of alternate or every other groups of the above-mentioned control rod groups so as to include at least a pair of control rods which are located in a similar manner to that of the KNIGHT's movement on a chess board.

Thus, according to the invention, a reactor operation with flattened radial power distribution is achieved by making the most of the allowed degree of freedom of selection of positions where the control rods are inserted.

The above and other objects, as well as advantageous features of the invention will become more clear from the following description of the preferred embodiment taken in conjunction with the accompanying drawings.

BRIEF DESCRIPTION OF THE INVENTION

DESCRIPTION OF THE PREFERRED EMBODIMENTS

Hereinafter, the invention will be described in detail through its preferred forms.

Figure 1:
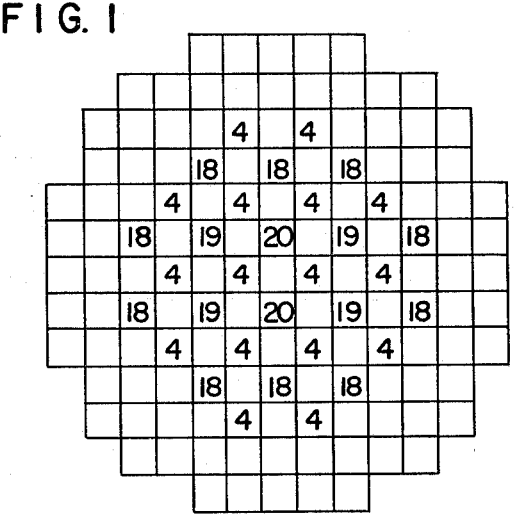
FIG. 1 shows an example of control rod pattern as adopted in a conventional boiling water nuclear reactor.
Figure 2A:
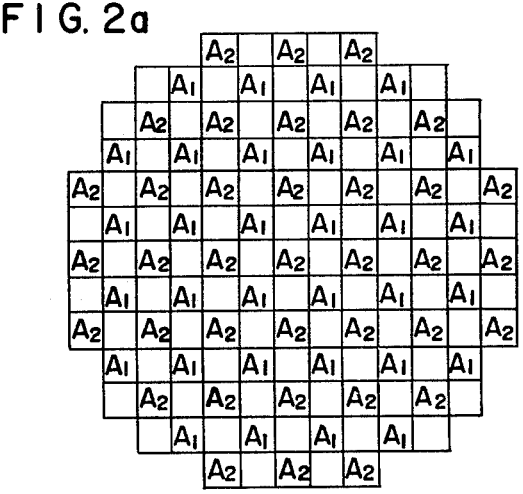
FIGS. 2a and 2b are illustrations of groups of control rods as grouped in accordance with a conventional operating method.
Figure 3:
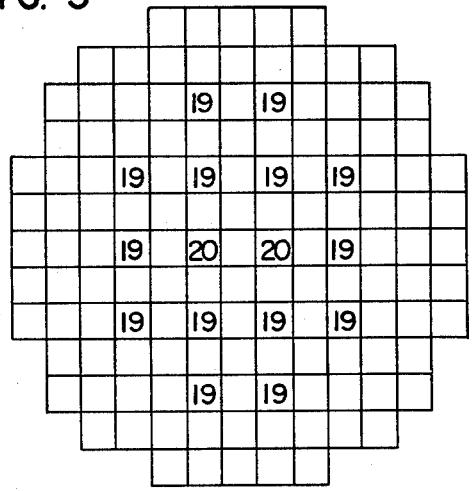
FIG. 3 illustrates an example of control rod pattern formed with deep control rods planned in accordance with the conventional operating method.
Figure 2B:
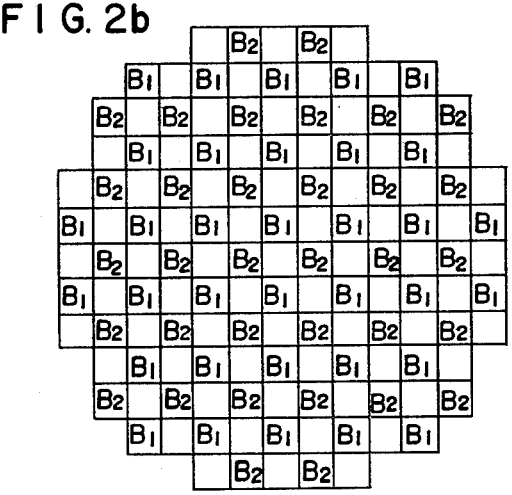
Figure 4A:
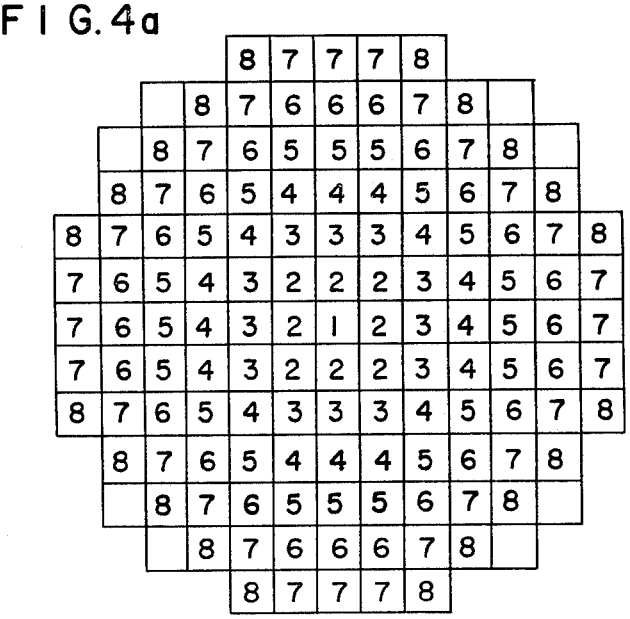
FIGS. 4a and 4c illustrate groups of control rods as grouped in accordance with the operating method of the present invention.
Figure 4B:
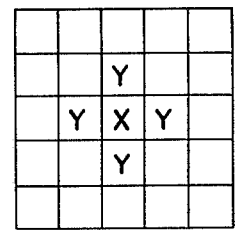

FIG. 4a shows control rods grouped in accordance with the operating method of the invention. A first group is constituted by a control rod located at the center of the core. The control rod constituting the first group is surrounded by 8 (eight) control rods which in combination constitute a second groups. A third group is constituted by control rods adjacent to and outside of the control rods of the second group. Similarly, (N+1)th group is constituted by control rods which are disposed adjacent to and outside of the control rods of Nth group similar to the third group. The term "adjacent" is used here to mean the positional relationship between X and Y as shown in FIG. 4b. Namely, the control rods Y which are in the same line as X and in the columns adjacent to X, as well as the control rods Y which are in the same column as X and in the lines adjacent to X, are referred to as the control rods "adjacent" to the control rod X.

Figure 4C:
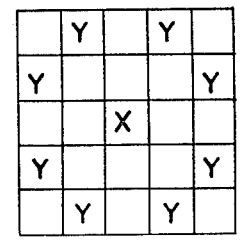

In practical operation, the insertion patterns of control rods are formed with control rods of a number required for obtaining the critical state of the reactor which are selected from control rods belonging to alternate or every other groups of the above mentioned control rod groups, e.g. every odd number groups thereof, so as to include at least a pair of control rods X and Y which are located as shown in FIG. 4c, that is in a similar manner to that of the KNIGHT's movement on a chess board. Namely, the control rods Y are in the lines next to the lines adjacent to X and in the columns adjacent to X, or in the lines adjacent to X and in the columns next to the columns adjacent to X.

Hereinafter, a description will be made as to an example of the operating method in accordance with the invention applied to a boiling water reactor of 800 MWe class. The thermal power and the operation standard of the reactor core are as follows.

thermal power of core: 2400 MW
operating standard:
maximum linear heat generating rate $\leq 1.34$ KW/ft,
minimum critical power ratio $\geq 1.22$.

In accordance with the teaching of the aforementioned Japanese Patent Application No. 115268/1976, the above reactor core include fuel assemblies each having an upper and a lower portions of different enrichments, so as to realize such a distribution of the infinite multiplicity factor $K_\infty$ as to deny the skewing of the axial power distribution attributable to the axial distribution of voids. The border between these upper and lower portions of different enrichments is located at a height of 11/24 of the whole height of the fuel assembly as measured from the bottom of the latter. Therefore, this reactor core does not require insertion of shallow control rods for controlling the axial power distribution.

Figure 5:
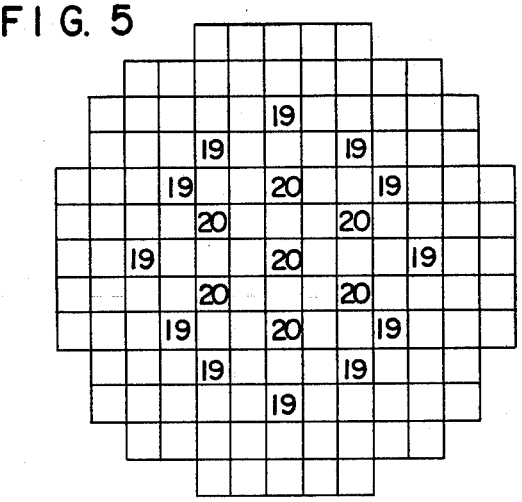
FIG. 5 illustrates an example of control rod pattern formed with 19 control rods belonging to the groups of odd numbers in accordance with the present invention.

FIG. 5 shows an example of control rod pattern formed with control rods belonging to the groups of odd numbers. More specifically, this pattern is constituted by 19 control rods including a control rod of the first group, located at the center of the core, 6 control rods belonging to the third group and 12 control rods belonging to the fifth group. The control rods of the first and the third groups are inserted to the level of 20/24 of the effective length of the core, while the control rods of the fifth group are inserted to the level of 19/24 of the same. This control rod pattern provides a maximum linear heat generating rate of 9.55 KW/ft and a minimum critical power ratio of 1.53. The margins of these values to those of the operation standard are 29% and 25%, respectively. This means that the power distribution pattern is flattened sufficiently. For information, the radial power peaking, which corresponds to the above-mentioned MCPR is 1.22.

Figure 6:
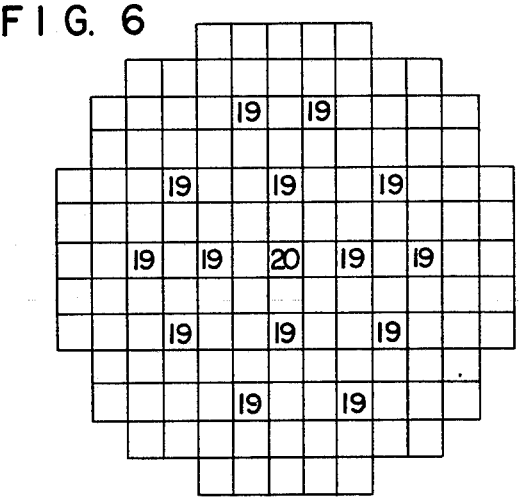
FIG. 6 illustrates a further example of control rod pattern formed with 15 control rods belonging to the groups of odd numbers in accordance with the present invention.
Figure 7:
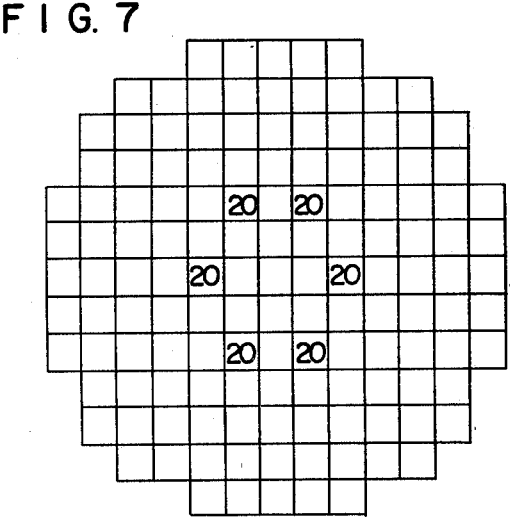
FIG. 7 illustrates a still further example of control rod pattern formed with 6 control rods belonging to the groups of odd numbers in accordance with the present invention.

FIGS. 6 and 7 illustrate different examples of control rod patterns formed with reduced numbers of control rods. It has been confirmed that the thermal allowance or margining equivalent to that of the pattern as shown in FIG. 5 can be obtained even with these reduced numbers of control rods.

Figure 8:
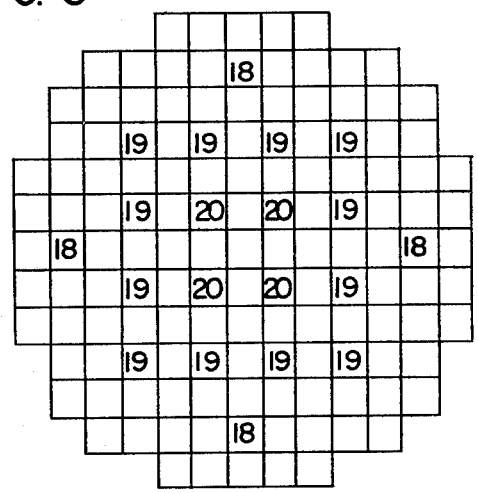
FIG. 8 illustrates a still further example of control rod pattern formed with control rods belonging to the groups of even numbers in accordance with the present invention.
Figure 9:
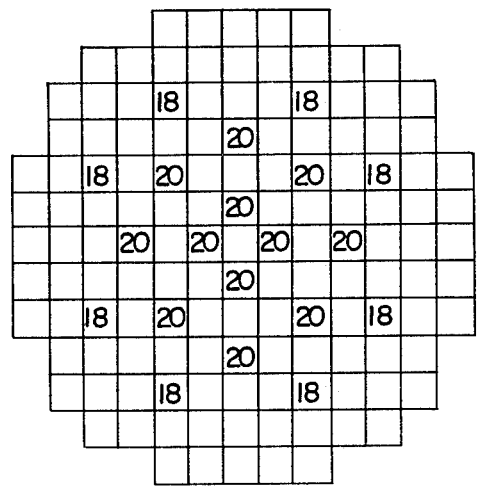
FIG. 9 illustrate another example of control rod pattern formed with control rods belonging to the groups of even numbers in accordance with the present invention.

FIGS. 8 and 9 show further examples of rod patterns formed with control rods belonging to the groups of even numbers. In these examples, the control rods of the second, fourth and sixth groups are used to form the control rod patterns. It has been confirmed that these control rod patterns also can obtain a maximum linear heat generating rate of less than 10 KW/ft and the MCPR around 1.5, and the reactor can be operated with the patterns at a thermal condition substantially equivalent to that in the operation with the pattern of control rods of odd number groups.

In fact, the maximum linear heat generating rates provided by the control rod patterns of FIGS. 6, 7, 8 and 9 are 9.70 KW/ft, 9.90 KW/ft, 9.99 KW/ft and 9.63 KW/ft, respectively, while the minimum critical power ratios are 1.45, 1.48, 1.52 and 1.47, respectively.

As has been described, according to the invention, the control rod pattern formed with control rods of either odd number groups or even number groups can afford operations of the reactor at substantially equivalent thermal conditions having sufficiently large margins.

Further, since the operating method of the invention affords a large elasticity or versatility to the selection or change of the numbers of control rods, it is possible to form a control rod pattern without incurring a substantial change in the thermal condition, even if the number of the inserted control rods has to be reduced for controlling the critical condition of the reactor.

Figure 10:
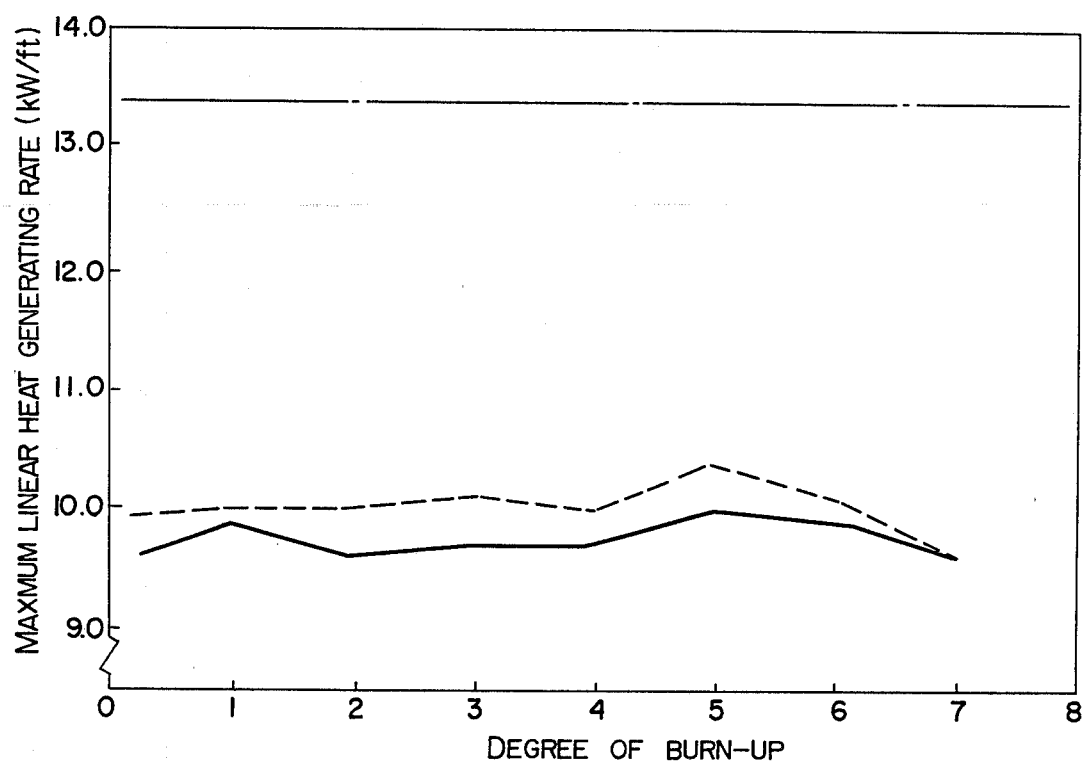
FIG. 10 shows the change of maximum linear heat generating rate of a reactor operated in accordance with the method of the present invention.
Figure 11:
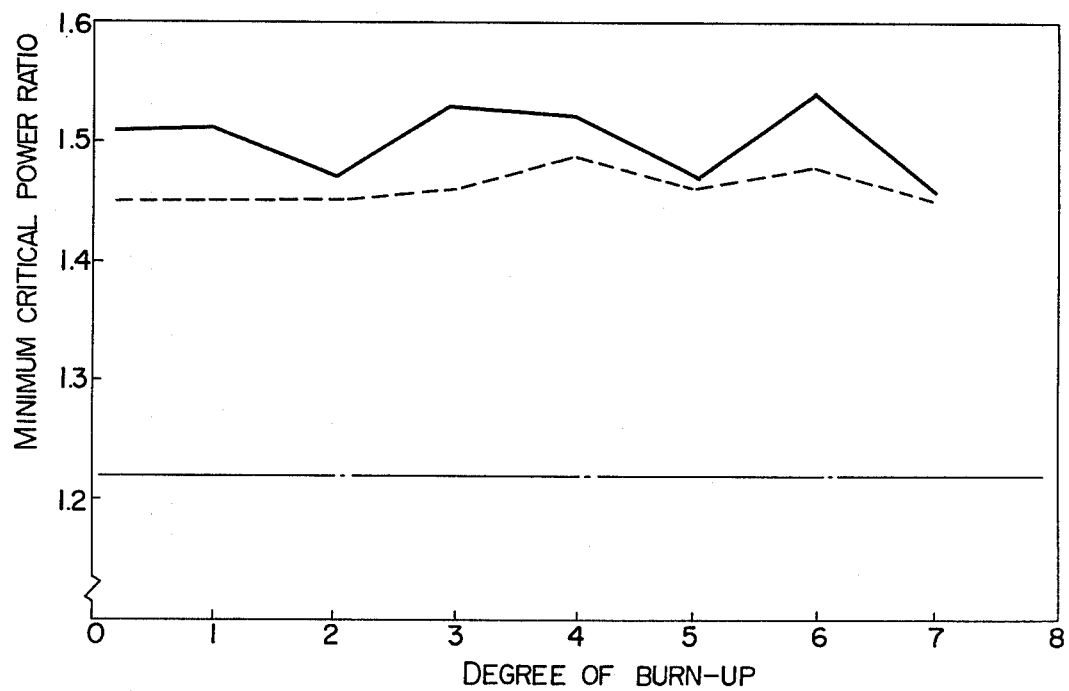
FIG. 11 shows the change of minimum critical power ratio (MCPR) of a reactor operated in accordance with the method of the present invention.

FIGS. 10 and 11 show by full-line curves, respectively, how the maximum linear heat generating rate and the MCPR are changed as the burn-up proceeds, when the aforementioned 800 MWe class boiling water reactor is operated with an alternating use of the control rod patterns formed with control rods of odd number groups and even number groups. It will be seen that the maximum linear heat generating rate is maintained at 10 KW/ft or smaller, while the level of the MCPR is maintained at 1.5 or thereabound, over the entire operation period.

In FIGS. 10 and 11, the maximum linear heat generating rate and the MCPR as obtained by the conventional operating method are shown by broken-line curves. From a comparison of the curves of full lines and broken lines, it will be seen that the method of the invention can afford operation of the reactor with a sufficiently large thermal margin which amounts about 4% in the maximum linear heat generating rate and about 2% in the MCPR, as compared with the conventional operating method.

We claim:

1. A method of operating a boiling water nuclear reactor having a core with a flattened axial power distribution by virtue of the fuel distribution and a plurality of control rods insertable into the core, comprising the steps of grouping the control rods into a plurality of groups including at least a first group consisting of one control rod which is located at the center of the core, a second group consisting of the nearest eight control rods which surround the control rod of the first group, a third group consisting of twelve control rods which are located adjacent to and outside of the control rods of the second group, a fourth group consisting of sixteen control rods which are located adjacent to and outside the control rods of the third group, a fifth group consisting of twenty control rods which are located adjacent to and outside of the control rods of the fourth group, and a sixth group consisting of twenty-four control rods which are located adjacent to and outside of the control rods of the fifth group, and operating the core with control rod patterns of only deep control rods during the operation period of the core other than when less than six inserted control rods are required for achieving the critical state of the core, the step of operating the core with only deep control rods including forming each deep control rod pattern with control rods which are selected from only alternate ones of the plurality of said groups and disposed in a symmetrical arrangement with respect to the center of the core, and deeply inserting the selected control rods into the core to a depth of at least ¾ of the core, all other control rods which are not selected being completely withdrawn and only the movement of the control rods achieving a radial flattened power distribution.

2. A method according to claim 1, wherein the step of operating the core with only deep control rods includes inserting the control rods which belong to the same group to the same deep position into the core for a respective deep control rod pattern.

3. A method according to claim 1, wherein the control rods of the plurality of control rods are of the same length, and the forming of deep control rod patterns includes selecting control rods from the even numbered ones of the plurality of groups.

4. A method according to claim 1, wherein the control rods of the plurality of control rods are of the same length, and the forming of deep control rod patterns includes selecting control rods from the odd numbered ones of the plurality of groups.

5. A method of operating a boiling water nuclear reactor having a core with a flattened axial power distribution by virtue of the fuel distribution and a plurality of control rods inserted into the core, comprising the steps of grouping the control rods into a plurality of groups including a first group consisting of one control rod which is located at the center of the core, and at least respective second, third and fourth groups of control rods arranged in substantially concentric circles with respect to the first group, the second group consisting of the nearest eight control rods surrounding the control rod of the first group, and operating the core with control rod patterns of only deep control during the operation period of the core other than when less than six inserted control rods are required for achieving the critical state of the core, the step of operating the core with only deep control rods forming of respective deep control rod patterns with control rods selected from only alternate ones of a plurality of said groups of control rods and disposed in a symmetrical arrangement with respect to the center of the core, and deeply inserting the selected control rods into the core to a depth of at least ¾ of the core, all other control rods which are not selected being completely withdrawn and only the movement of the control rods achieving a radial power distribution.

6. A method according to claim 5, wherein the control rods of the plurality of control rods are of the same length, and the formation of deep control rod patterns includes selecting control rods from the odd numbered ones of the plurality of groups of control rods.

7. A method according to claim 5, wherein the control rods of the plurality of control rods are of the same length, and the formation of deep control rod patterns includes selecting control rods from the even numbered ones of the plurality of groups of control rods.

8. A method according to claim 6 or 7, wherein for each deep control pattern, the control rods belonging to the same group are inserted to the same deep position in the core.

* * * * *